United States Patent [19]

Goldman

[11] Patent Number: 4,558,300

[45] Date of Patent: Dec. 10, 1985

[54] COMPUTER MAP

[75] Inventor: Saul Goldman, Toronto, Canada

[73] Assignee: Computer Sign Systems Limited, Markham, Canada

[21] Appl. No.: 398,510

[22] Filed: Jul. 15, 1982

[51] Int. Cl.[4] .............................................. G08G 1/00
[52] U.S. Cl. .............................. 340/286 M; 340/524; 340/711
[58] Field of Search ................. 340/286 M, 524, 522, 340/711

[56] References Cited

U.S. PATENT DOCUMENTS 2,204,315  6/1940  Levin .............................. 340/286 M Primary Examiner—John W. Caldwell, Sr.
Assistant Examiner—Ellwood G. Harding
Attorney, Agent, or Firm—Rogers, Bereskin & Parr

[57] ABSTRACT

An electronic map for selectively displaying routes to various locations in a building such as a shopping mall is disclosed. The map displays a floor plan indicating a plurality of stations (shops, public telephones, washrooms, etc.) and paths connecting the various stations. A particular station can be selected at a keyboard, and a path extending from the location of the map to the selected station is then visually indicated, as with a string of light emitting diodes physically located on the map. In a multi-level building where several floor plans are displayed the map can visually indicate a path extending from the map to, for example, a stairwell, the vertical direction to be taken on the stairwell, and a continuation of the path from the stairwell to a station on another level.

1 Claim, 4 Drawing Figures

COMPUTER MAP

The invention relates to an electronic map for selectively displaying routes to various locations in a building such as a shopping mall.

Maps having a plastic, back-lit display are commonly used in shopping centres to indicate the location of shops, washroom facilities, public telephones etc. Such maps are often difficult to read, involving colour or numbering schemes sometimes too complex to permit a particular facility to be easily located. Additionally, these maps may have to be replaced or refinished when ownership of a particular store changes. Accordingly, the invention provides a directory and map which in various embodiments seeks to overcome one or more problems associated with such prior art maps.

In its broadest aspect the invention provides an electronic map comprising at least one floor plan of a structure, displaying a plurality of stations (such as shops, washrooms, public telephones etc.) and paths connecting the stations. A directory is provided to identify the various stations displayed on the floor plan, and a keyboard is provided for selecting a particular station. Path indicating means such as a network of light emitting diodes selectively activated by appropriate logic circuitry respond to the selection of a particular station to visually indicate on the floor plan a path extending from a predetermined point on the floor plan to the selected station. The predetermined point will generally be selected to correspond to the location of the electronic map on the floor plan.

In a preferred embodiment of the electronic map intended for use with multi-level structures the path indicating means respond to the selection of a particular station at a level other than that of the map by indicating on a first floor plan a path extending from the location of the map to a stairwell (or alternatively an escalator or elevator), the vertical direction to be taken on the stairwell and on a second floor plan the continuation of the path from the stairwell to the selected station.

The term "keyboard" as used in this specification includes any collection of switches, whether push button, toggle or rotary, which can be selectively operated to produce a signal indicative of a particular station, as well as a conventional key pad bearing alphanumeric characters and adapted to generate coded signals indicative of particular stations.

Advantages and objects of the invention will become more apparent from a description below of a preferred embodiment, taken together with drawings in which.

Figure 1:
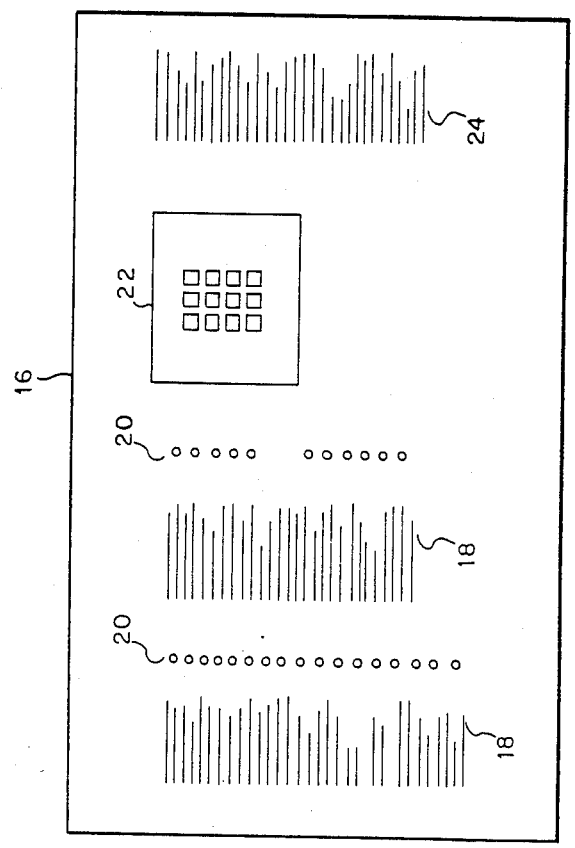
FIG. 1 is a perspective view of a computer directory system and map embodying the invention.

Reference is made to FIG. 1 which illustrates a computer directory system generally indicated by the reference numeral 10. The directory system 10 comprises a housing 12 provided with a display panel 14, video display unit (cathode ray tube) 15, and a user input console 16. The display 14 is formed of a transluscent plastic sheet bearing floor plans of the building in which the directory system 10 is to be located. The display panel 14 is of the type commonly found in shopping centres, back-lit with lights located within the housing 12 to provide a bright, attractive display.

The user input console displays a directory 18 indicating a plurality of stations (stores, washrooms, public telephones etc.). The directory 18 is preferably constructed of a plurality of metal or plastic strips each bearing a description identifying a particular station, and affixed in a conventional manner to the user input console 16. The strips are preferably removably affixed to accommodate changes in ownership of particular stores or relocations. However, it will be apparent from the description of the computerized operation below, that some such changes can be accommodated by a reprogramming of the directory system 10 without physical changes to the structure itself.

Figure 2:
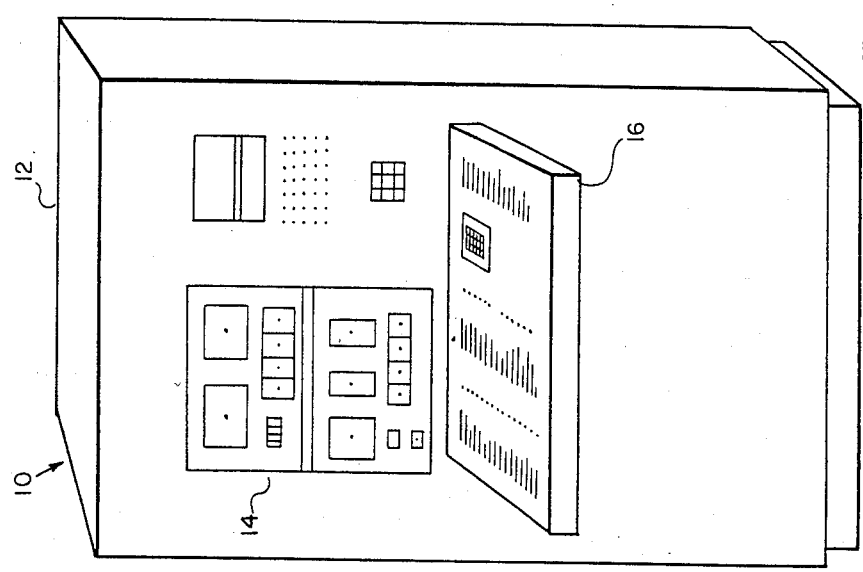
FIG. 2 is a plan view of a user control console with a directory and keyboard for activating the directory system.

In the view of FIG. 2 the directory listing is diagrammatically illustrated by a plurality of horizontal lines. A number of aligned push buttons 20 are illustrated in a similar manner. Each item in the directory listing is associated with one such push button 20, and selection of that particular push button 20 generates a signal (an open or closed circuit) associated with the particular station selected. Additionally, a numerical key pad 22 is provided on which coded signals can be composed. These coded signals can be arranged to correspond to digital codes associated with each directory listing (and displayed adjacent to each listing) so that a particular station can be selected by keying its code, instead of pressing a particular button 20. However, such a function would be redundant, and the principle function of the key pad 22 is to permit the composition of category codes selected from a category listing 24.

On location, a user might consult the category listing 24 to determine what stores provide a particular service. The code corresponding to that service would be composed on the numerical key pad 22, and stores providing such services could then be displayed on the video display unit 15. A particular store could then be located in the directory listing, and the corresponding push button 20 pressed to activate the directory system 10 to display the location of the store and to simultaneously display a route extending to the store. It will be appreciated that to perform the above functions it is not necessary to provide both the push buttons 20 and key pad 22. All store locations and category listings can be digitally coded, or alternatively all can be associated with particular push buttons 20. The numerical coding system involving the key pad 22 is particularly useful with the category listing 24, as changes in or expansion of the category listing 24 can then be readily accommodated by reprogramming the directory system 10 without requiring extensive changes in the physical layout of the user input console 16.

Figure 3:
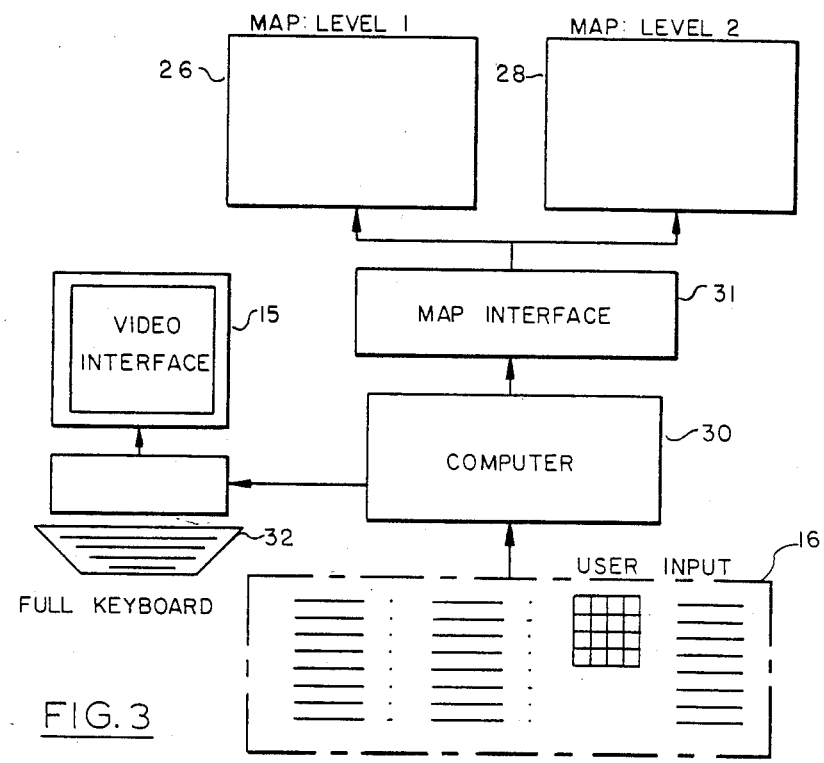
FIG. 3 is a block diagram representing the basic components of the computer directory system; and, FIG. 4 is an enlarged view of floor plans displayed by the computer directory system.

The computer directory system 10 is illustrated in block diagram form in the view of FIG. 3. The system 10 comprises two maps (floor plans) 26, 28 of two levels of a building (these maps 26, 28 are illustrated in greater detail in the view of FIG. 4). Also shown are the video display 15 and user input console 16. A computer 30, which can be an appropriately programmed micro processor with memory, coordinates the operation of the directory system 10.

The computer 30 responds to the pushing of the buttons 20 or the composition of the digital code on the key pad 22. When a particular button is pushed, the computer 30 determines which station has been selected, and through map interface circuitry 31 indicates on the maps 26, 28 the location of the station and also a route extending from the location of the system 10 to the selected station. Light emitting diodes (LED's) are used as visual indicators, physically located in the maps 26, 28. The map interface circuitry 31 consequently includes electronic drivers for selectively activating the LED's to indicate stations and routes.

When an item on the category listing 24 is coded on the key pad 22, the computer 30 selects from memory the particular stations corresponding to the selected category (for example all shoe stores if the shoe category is selected), displays these stores on the video display 15, and simultaneously indicates the store locations by flashing LED's on the map. As mentioned above, the user can then refer to the directory 18 to locate one of the stations so displayed, and press the button 20 associated with the station to obtain a visual indication of the route to the station on the maps 26, 28.

The operation of the computer 30 is programmed or regulated by means of an erasable programmable read only memory (EPROM) erasable under ultra violet light. Instructions placed in the EPROM effectively associate each particular button 20 with a particular location (indicated by a LED) on the maps 26, 28, which LED's are to be activated to indicate the route to a particular location in response to the pressing of one of the buttons 20, and which LED's are to be activated and flashed to indicate particular stations in response to the composition of a category code on the key pad 22.

A hard-wired interface between the user input console 16 and maps 26, 28 could be provided. However, one advantage obtained by use of the computer 30 and EPROM (or other programmable interfaces) is that extensive changes to the maps 26, 28, directory 18 and category listing 24 can be avoided with changes in store ownership and services.

A variety of changes can be accommodated by reprogramming the EPROM. For example, if the display unit 10 is moved, the computer 30 can effectively be reprogrammed to recognize a new location starting point on the directory maps 26, 28 (but LED's musot of course be provided to represent all stations in the building, including any station where the display unit 10 might be located). In a similar manner, changes in store location can be reprogrammed, as can be changes in the category listing 24 when services available in the building change.

A key board 32 is provided to permit input of text to be displayed on the video unit 15. The text contemplated will typically be commercial announcements or announcements of events occuring in the building in which the building directory system 10 is located.

Figure 4:
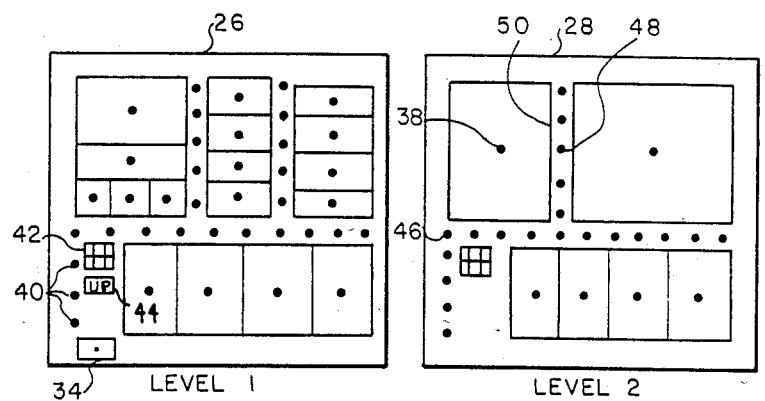

FIG. 4 illustrates in detail the maps 26, 28. Rectangles within the maps 26, 28 generally indicate particular stations, and the open spaces between the rectangles represent corridors. Dark circles located in the centre of the rectangles represent LED's used to indicate particular stations, and dark circles located in corridor areas represent LED's used to indicate routes between particular stations. The LED's used to indicate particular stations are preferrably of a first colour (for example, yellow), and those used to indicate routes are preferrably of a second colour (for example red). The location of the directory system 10 is illustrated on the map 26 at the position 34, also by a LED.

To illustrate how the directory system 10 would be used to locate a store and a route to a store, it will be assumed that a user wishes to locate a particular store 36 (which is located on level 2 of the structure). The user presses the button 20 associated with the particular store 36 in the directory 18 at the user input console 16. The selection is detected by the computer 30 which then activates the LED 38 to indicate the location of the selected store. At the same time LED's 40 are activated on map 26 to indicate a path extending from the location of the directory 34 to a stairwell 42, and a direction indicator 44 is then illuminated to indicate that one is to take the stairwell 42 up. A string of LED's extending between LED's 46, 48 on map 28 are activated to indicate the continuation of the desired route from the top of the stairwell 42 to an entrance 50 of the store 36.

Only two maps 26, 28 have been indicated for the purposes of illustration. It will be apparent that a plurality of maps could be used, and if necessary, a complex path extending along various levels of a structure can be indicated.

A particualr directory system comprising an electronic map embodying the invention has been illustrated. It will be appreciated that changes of a workshop nature can be made in the directory system illustrated, and that a variety of systems adapted to particular applications can be constructed without departing from the scope and spirit of the invention.

I claim:

1. A directory console and mount for a multi-level building, said building having at least two floors, said console being located on one floor of said building and comprising:
   (a) a first floor plan map of said one floor of said building and a separate second floor plan map of the other floor of said building, said first floor plan map including a display of the location of said console, each floor plan map displaying a plurality of stations on its associated floor, each floor plan map further displaying paths connecting said stations and access means for use in movement between said floors, said display of said access means including a display of the direction of movement form said one floor to said other floor,
   (b) a plurality of path indicator lights each in a first colour for indicating, when illuminated, a path from said console to a selected station,
   (c) a plurality of station indicator lights one for each station and each of a different colour from said first colour, for illuminating a selected station,
   (d) a direction indicator light for illuminating said display of said access means,
   (e) a directory identifying the stations displayed on each of said floor plan maps,
   (f) a keyboard at which a particular station on either of said floor plan maps can be selected,
   (g) station indicating means responsive to the selection on said keyboard of a particular station for illuminating on the floor plan map on which said station is displayed the station light associated with such station,
   (h) and path indicating means responsive to the selection on said keyboard of a said particular station on said second floor plan map for illuminating on the first floor plan map those path indicator lights which define a path extending from said console to said access means, and for illuminating on the second floor plan map those path indicator lights defining a path extending from said access means to said particular station, and for illuminating said direction indicator light at said access means.

* * * * *